UNITED STATES PATENT OFFICE 2,600,448

COPOLYMERS FROM ALLYL ESTERS AND ACRYLIC ESTERS

William L. Van Horne and La Verne N. Bauer, Philadelphia, and Harry T. Neher, Bristol, Pa., assignors to Rohm & Haas Company, Philadelphia, Pa., a corporation of Delaware No Drawing. Application July 15, 1949, Serial No. 105,048

4 Claims. (Cl. 260—86.1)

This invention deals with copolymers which are oil-soluble and which, when dissolved in a hydrocarbon liquid having a waxy pour point, depress the pour point thereof. It deals further with compositions composed of liquid petroleum products having a copolymer of this invention dissolved therein.

The copolymers here claimed are formed from (A) an ester of a saturated, aliphatic, monocarboxylic acid of sixteen to twenty-four carbon atoms and an alcohol selected from allyl, 2-chloroallyl, and methallyl alcohols and (B) an ester of acrylic acid and a saturated aliphatic monohydric alcohol of four to twelve carbon atoms. In forming these copolymers there are mixed one molecular proportion of the allyl ester A and at least one half a molecular proportion of the acrylic ester B. The proportion of the latter does not, however, exceed a value which is one half of the number of carbon atoms in the longest chain of the alcohol residue of the acrylic ester.

It has long been known that resinous materials can be dissolved in hydrocarbons and cause thickening. In some cases, solution of resinous materials improves such properties as the viscosity-temperature relationship. Some resinous materials raise the pour point of oils; others do not affect this property; still others depress the pour point. This last effect is not predictable.

We have found that polymers of allyl stearate, allyl palmitate, methallyl laurate, allyl octoate, allyl nonoate, nonyl acrylate, octyl acrylate, cetyl acrylate, and the like do not lower the pour point of oils when they are dissolved therein. Nor do mixtures of the separate polymers do so. Yet we have found that copolymers of the above defined allyl esters and acrylic esters in the prescribed proportions cause a depression of the pour point of wax-containing hydrocarbon fluids.

As an allyl ester there is taken an ester of the formula

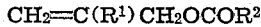

wherein $R^1$ is a methyl group, hydrogen or chlorine and $R^2$ is an alkyl group having a chain of fifteen to twenty-three carbon atoms. Typical of these esters are allyl palmitate, allyl margarate, allyl stearate, allyl tricosanate, allyl tetracosanate, methallyl palmitate, methallyl stearate, methallyl tetracosanate, and the like. In each case the carbon chain of the monocarboxylic acid contains at least sixteen carbon atoms. Mixtures of long-chained fatty acids may be used, the mixtures being prepared from individual acids or being used as readily available mixtures of commerce. The allyl and methallyl groups appear quite interchangeable, although copolymers from the methallyl esters may have somewhat greater oil solubility. The chloroallyl group may also be used and is equivalent to the methallyl group or the allyl group proper.

The allyl esters are prepared by conventional methods. Thus, the alcohol and acid may be heated together in the presence of an esterification catalyst and a solvent which promotes removal of water by azeotropic distillation. Instead of acids, anhydrides, where available, or acid halides may be used. Interchange reactions are useful for preparing the allylic esters, particularly those from methallyl alcohol.

The acrylic esters have the general formula

where R is an alkyl group of four to twelve carbon atoms. R may be such a group as butyl, isobutyl, sec.-butyl, amyl, hexyl, heptyl, octyl, nonyl, decyl, undecyl, or dodecyl. These alkyl groups may be of branched or straight-chain structure. In a branched group the longest single carbon chain determines for purposes of this invention the largest proportion of acrylic ester which may be effectively copolymerized with a defined allyl ester, the upper proportion being a number equal to one half of the number of carbon atoms in this chain. Particularly useful acrylic esters are butyl acrylate, 2-ethylbutyl acrylate, 2-ethylhexyl acrylate, 3,5,5-trimethylhexyl acrylate, and dodecyl acrylate. Methods for preparation of such esters are well known. Mixtures of the acrylic esters may be used if desired, the upper limiting proportion then being based on the average chain length.

For the preparation of the copolymers at least one of the allyl esters is mixed with at least one of the acrylic esters within the defined proportions. The mixture is dissolved in an inert organic solvent, such as benzene, toluene, xylene, or naphtha, and an organic peroxide is added to serve as catalyst. A copolymer is formed when the mixture is heated. Temperatures of 70° to 160° C. may be used. If desired, the copolymer may be taken up in a mineral oil to form a concentrate useful for mixing with lubricating oils and other hydrocarbon fluids having a waxy pour point.

Useful catalysts include acetyl peroxide, caproyl peroxide, lauroyl peroxide, benzoyl peroxide, dibenzoyl peroxide, di-tert.-butyl diperphthalate, tert.-butyl perbenzoate, 2,2-bis(tert.-butyl-peroxy)butane, methyl ethyl ketone peroxide, di-tert.-butyl peroxide, and tert.-butyl hydroperoxide. One or more of such catalysts may be used in amounts of 2% to 15% or more of the weight of esters to be copolymerized. The catalyst is desirably added from time to time as copolymerization proceeds. While the copolymerization may usually be started with a low concentration, such as 2% of the weight of the mixed monomers, it is desirable to add peroxide up to a total of 15% or more in order to promote copolymerization within a reasonable time and in good yield.

Presence of an inert atmosphere is desirable. This may be obtained by use of an inert gas, such as nitrogen, or use of vapors of a volatile inert organic solvent.

Useful procedures for preparing the copolymers of this invention are shown in detail in the following illustrative examples.

*Example 1*

A mixture consisting of 10 parts by weight of allyl tetracosanate, 10 parts of dodecyl acrylate, 30 parts of toluene, and 1 part of benzoyl peroxide was stirred and heated in a reaction vessel. Nitrogen was passed therethrough to provide an inert atmosphere. The mixture was heated at 120° C. for 4.5 hours and then at 104°–106° C. for 3.5 hours. At the end of the first three hours a solution of 0.4 part of benzoyl peroxide in 10 parts of toluene was added. After 4.6 hours one part of benzoyl peroxide in 10 parts of toluene was added. Additions of 0.4 part of the same peroxide in 10 parts of toluene and of 0.15 part of the peroxide in 10 parts of toluene were made at 5.67 and 6.67 hours respectively. Heating was discontinued at the end of eight hours. A copolymer giving solutions of low viscosity was formed in a yield of 99.6%.

The copolymer was transferred to a light lubricating oil by mixing 71 parts of the above toluene solution of copolymer with 26 parts of light lubricating oil and heating the mixture under reduced pressure. With a final temperature of 140° C. at 1 mm. the toluene was completely removed and a 35.2% concentrate of copolymer in oil obtained. This solution became wax-like when cooled. It was useful for supplying the copolymer to lubricating oil compositions.

A solution of 0.5% of this copolymer in a Pennsylvania oil reduced the pour point 20° F.

*Example 2*

A mixture of 50 parts of allyl stearate, 50 parts of n-octyl acrylate, 100 parts of toluene, and 5 parts of benzoyl peroxide was gradually run into a reaction vessel which had been swept out with nitrogen and heated to 115° C.–121° C. Copolymerization was observed to start five minutes after the first portion of mixture was added. The entire mixture was run into the reaction vessel within two hours. At the end of the third hour 2 parts of benzoyl peroxide in 10 parts of toluene was added. At the end of 4.5 hours the temperature was permitted to drop to about 100° C., at which level it was maintained for the rest of the time of copolymerization. Additions of benzoyl peroxide, each in a 10 part portion of toluene, were made after 4.25, 5.75, and 6.75 hours in amounts of 5, 2, and 0.8 parts respectively. Heating was discontinued at the end of eight hours. The product was a 40% solution of copolymer, formed in a yield of 89%. A 30% solution of this copolymer in toluene had a viscosity of 7.8 cs. at 100° F.

A solution of 0.5% of this copolymer was made in a 150 neutral from conventionally refined Pennsylvania oil. The pour point was depressed 55° F.

*Example 3*

A mixture of 12 parts of allyl stearate, 8 parts of n-butyl thioacrylate, 25 parts of toluene, and one part of benzoyl peroxide was heated in an atmosphere of nitrogen under reflux. Four increments totalling 4.8 parts of benzoyl peroxide were added at approximately hourly intervals together with 30 parts of toluene. The total heating time was 8.3 hours. A copolymer in a yield of 82% was obtained. It was soluble in lubricating oils. It depressed the pour point of waxy oils and exhibited some anti-oxidant properties.

*Example 4*

A mixture of 68.6 parts by weight of allyl palmitate, 31.4 parts of 2-ethylbutyl acrylate, 50 parts of toluene, and 5 parts of benzoyl peroxide was added to a reaction vessel heated at 113° C. to 120° C. during the course of two hours. Increments of 2 parts, 5 parts, 2 parts, and 0.8 part of benzoyl peroxide were added at times of heating of 3, 4.5, 5.5, and 6.5 hours respectively. Temperature of copolymerization was held above 113° C. for 4.25 hours and held at 100° C. for the next two hours, and then held at 90°–95° C. for the rest of the heating period which amounted in all to 7.67 hours. A solution of 39% of copolymer was obtained in a yield of 93%. The viscosity of a 30% solution of the copolymer in toluene was 4.3 cs. at 100° F.

*Example 5*

In accordance with the above procedures 30 parts of isoheptyl acrylate, 70 parts of allyl stearate, 50 parts of toluene, and 5 parts of benzoyl peroxide were heated at 118°–121° C. and then at 101°–102° C. for 7.75 hours. Repeated additions of benzoyl peroxide in toluene brought the total amount of benzoyl peroxide to 15 parts and of toluene to 111 parts. The yield of copolymer was 93.5%.

*Example 6*

The same procedure was followed with a mixture of 41 parts of allyl stearate, 59 parts of n-hexyl acrylate, a 1:3 mole ratio of monomer, 100 parts of toluene, and 5 parts of benzoyl peroxide. During copolymerization increments of benzoyl peroxide amounting to 9.8 parts and of toluene amounting to 80 parts were made. Initial copolymerization was conducted at 120°–114° C., and in the last stages the temperature was held at about 102° C. Copolymerization was 98.5% complete at the end of 8 hours. A 30% solution of the copolymer in toluene had a viscosity of 52.3 cs. at 100° F.

The above preparation repeated with tert.-butyl perbenzoate in place of benzoyl peroxide in a total of 11 grams gave a similar copolymer. The viscosity of a 30% toluene solution was 61 cs. at 100° F.

The pour point depressing action of the copolymers of this invention was studied with three oils making use of the standard A. S. T. M. pour test (D97–47) and supplementing it from time to time with maximum pour tests and shock chilling. The maximum pour test is described in Proc. A. S. T. M. 45, appendix I, p. 244 (1945). The shock chilling determination is made by observing the samples during the initial cooling step with the cooling jacket at −60° F.

Oil I was a 150 Pennsylvania neutral having a pour point of +25° F. Oil II was an S. A. E. 90 gear oil compounded from 30 parts of a 180 Pennsylvania neutral and 70 parts of a 150 Pennsylvania bright stock. It had a pour point of +25° F. A third oil used (III) was a 500 Mid-Continent solvent-extracted neutral (S. A. E. 30) having a pour point of +25° F. This was known to be an oil which was not readily changed as to its pour point. The response of these oils to small amounts of copolymer is shown in the following section.

A copolymer from one molecular proportion of allyl palmitate and 0.75 molecular proportion of 2-ethylbutyl acrylate was dissolved in oil I. At 0.5% it gave a pour point of −20° F., at 0.25% of −15° F., and at 0.1% of −5° F.

A copolymer from allyl palmitate and dodecyl acrylate in a molar ratio of 1 to 0.75 depressed the pour point of oil I 40° F. at 0.1% to 0.5%. In oil II at 0.1% it reduced the pour point to −5° F. In oil III under shock chilling the pour point was found to be −10° F. at 0.5% concentration.

A copolymer from allyl palmitate and dodecyl acrylate in a molar ratio of 1:1.5 was found to have a large molecular size, as measured by a viscosity of 300 cs. at 100° F. in a 30% toluene solution. In oil I at 0.5% and 0.25% it reduced the pour point to −15° F. In oil II at 0.1% the pour point was reduced to 0° F. In oil III at 0.5% the pour point under shock chilling was −10° F.

A copolymer from allyl palmitate and dodecyl acrylate in a molar ratio of 1:3.5 in oil I at 0.5% gave a pour point of −25° F. and at 0.1% of −20° F. In oil III the pour point under shock chilling was −10° F. and by the maximum pour method of repeated cooling and warming was +5° F.

A copolymer from allyl palmitate and dodecyl acrylate in a molar ratio of 1:6 in oil I at 0.5% gave a pour point of −25° F.; in oil II at 0.1% of +15° F.; and in oil III at 0.5% of −20° F. under shock chilling. It should be commented that a higher content of dodecyl acrylate groups can be used in such a copolymer with definite depression of pour point of oils such as oil I. This combination appears, however, to be an exception as to useful proportions of the two starting monomers.

It might be noted that some allyl stearate-propyl acrylate copolymers have a slight effect on pour points. For example, a 1:1 mole ratio copolymer at 0.5% in oil I gave a pour point of 10° F. but was not effective at 0.25%. This copolymer imparted to a 30% solution in toluene a viscosity of 141 cs. at 100° F. and gave some increase to the viscosity index of oils in which it was dissolved.

A copolymer was prepared from one mole of allyl stearate and a half mole of n-butyl acrylate. A 30% solution of this copolymer in toluene had a viscosity of 203 cs. at 100° F. In oil I this copolymer depressed the pour point 10° to 15° F.

A copolymer from the same monomers but in a ratio of 1:1.37 gave a pour point in oil I of −5° F. at 0.5% to 0.1%. A 30% solution of this copolymer in toluene had a viscosity of 31 cs. at 100° F.

A copolymer from one mole of allyl stearate and two moles of butyl acrylate, providing a viscosity of 30 cs. at 100° F. to a 30% solution in toluene, was tested in oil I. At 0.5% it gave a pour point of −10° F., and at 0.25% of +10° F.

Copolymers with larger ratios of butyl acrylate groups to allyl stearate groups did not have pour depressing action.

Copolymers were prepared from allyl stearate and n-hexyl acrylate in mole ratios of (a) 1:2, (b) 1:2.5, (c) 1:3, and (d) 1:4 and tested at 0.5% in oil I. Pour points were found as follows: (a) −25° F., (b) −25° F., (c) −10° F., and (d) +30° F.

A copolymer prepared from allyl stearate and isoheptyl acrylate in a mole ratio of 1 to 0.8 gave a pour point of −10° F. in oil I at 0.5% and 0.25%; in oil II at 0.04%+5° F.; and in oil III at 0.5% under shock chilling 0° F.

A copolymer prepared from allyl stearate and n-octyl acrylate in a mole ratio of 1:1.8 gave a pour point in oil III at 0.5% of −20° F. (A. S. T. M.) and +5° F. by shock chilling. In oil I at 0.5% it gave a pour point of −30° F.

A copolymer from allyl stearate and octyl acrylate in a 1:6 mole ratio was dissolved in oil I at 0.5%. The pour point of this solution was 30° F. The same pour point was obtained with 0.5% of a copolymer from the same monomers in a 1:8 mole ratio.

There were separately polymerized allyl stearate and n-octyl acrylate. The two polymers were mixed in a ratio of 1:1.8, the same ratio as used above for a copolymer from the identical starting materials. The mechanical mixture of polymers failed to depress the pour point of the standard oils. Neither polymer alone gave depression of pour point of the above oils.

A copolymer of methallyl stearate and n-octyl acrylate in a mole ratio of 1:2 depressed the pour point of oil I at 0.5% to −10° F.

A copolymer of methallyl stearate and dodecyl acrylate in a ratio of 1:3.5 depressed the pour point of oil I at 0.5% of the copolymer to −20° F. In oil II at 0.1% the pour point was +10° F. In oil III at 0.5% the pour point was +5° F.

Copolymers of allyl tetracosanate and dodecyl acrylate in mole ratios of 1:1.7 and 1:5.1 respectively were examined in oil I at 0.5%. With both copolymers the pour point was +5° F.

A copolymer of 2-chloroallyl stearate and n-butyl acrylate in a mole ratio of 1:1.37 was prepared. In oil I at 0.25% it gave a pour point of −10° F. and in oil III at 0.5% it gave a pour point of −15° F.

A copolymer from allyl stearate and butyl acrylate in a 1:0.5 mole ratio imparted a viscosity of 203 cs. at 100° F. to a 30% solution in toluene. This copolymer was dissolved in a Pennsylvania 150 neutral having a viscosity index of 107. At 0.5% of the copolymer the viscosity index became 114 and at 2% it became 127.

A copolymer from allyl palmitate and dodecyl acrylate in a 1:1.5 ratio was carried to a molecular size which gave a viscosity of 300 cs. to a 30% solution in toluene. In the above oil at 0.5% the resulting solution had a viscosity index of 116 and at 2% an index of 134.

The copolymers of this invention are novel as to composition, requiring specific monomers in defined proportions. They are characterized by being oil-soluble. The solutions of these copolymers in hydrocarbon fluids having waxy pour points exhibit lower pour points than for the oils alone. Concentrations of copolymers of about 0.01% to 5%, and preferably 0.04% to 2%, are effective toward this end. They have some thickening action and improve the viscosity-temperature behavior of oils. In fact one of the distinguishing characteristics of the copolymers here shown rests upon the fact that the copolymers can be carried to moderately high molecular weights at which considerable improvement in viscosity index is obtained. Thus, molecular weights up to 50,000 or more can be obtained.

Furthermore, they are stable copolymers and may be used in conjunction with other polymeric materials and other types of oil-additives, such as anti-oxidants, wear-resisting agents, detergents, and the like.

We claim:

1. An oil-soluble copolymer from (A) an ester of an alkanoic acid of sixteen to twenty-four carbon atoms and an alcohol selected from the class consisting of allyl, 2-chloroallyl, and methallyl alcohols and (B) an ester of acrylic acid and a saturated aliphatic monohydric alcohol having an alkyl group of four to twelve carbon atoms, the ratio of the groups from the first ester (A) to the second ester (B) varying from one to one half to one to a number which is equal to one half of the number of carbon atoms in the longest chain of the alcohol forming the second ester.

2. An oil-soluble copolymer from allyl stearate and dodecyl acrylate, the ratio of groups from the stearate to the groups from acrylate being from 1:0.5 to 1:6.

3. An oil-soluble copolymer from allyl stearate and octyl acrylate, the ratio of groups from the stearate to the groups from the acrylate being from 1:0.5 to 1:4.

4. An oil-soluble copolymer from allyl palmitate and dodecyl acrylate, the ratio of groups from the palmitate to groups from the acrylate being from 1:0.5 to 1:6.

WILLIAM L. VAN HORNE.
LA VERNE N. BAUER.
HARRY T. NEHER.

REFERENCES CITED

The following references are of record in the file of this patent:

UNITED STATES PATENTS

| Number | Name | Date |
|---|---|---|
| 2,125,885 | Bruson | Aug. 9, 1938 |
| 2,129,664 | Barrett | Sept. 13, 1938 |
| 2,234,829 | Neher | Mar. 11, 1941 |
| 2,407,954 | Fenske et al. | Sept. 17, 1946 |
| 2,419,221 | Kenyon | Apr. 22, 1947 |
| 2,440,318 | White | Apr. 27, 1948 |
| 2,441,023 | Larsen | May 4, 1948 |
| 2,524,563 | Evans et al. | Oct. 3, 1950 |

OTHER REFERENCES

"Allyl Alcohol," by Shell Devel., 1946, pages 27 to 31 pertinent. (Copy in Division 31.)